No. 777,181. PATENTED DEC. 13, 1904.
W. L. CHENEY.
LATHE.
APPLICATION FILED JUNE 10, 1903.
NO MODEL. 2 SHEETS—SHEET 1.

Witnesses:
C. A. Jarvis
B. C. Stickney

Inventor:
Walter L. Cheney.
By his Attorney,
F. H. Richards.

No. 777,181. PATENTED DEC. 13, 1904.
W. L. CHENEY.
LATHE.
APPLICATION FILED JUNE 10, 1903.
NO MODEL. 2 SHEETS—SHEET 2.
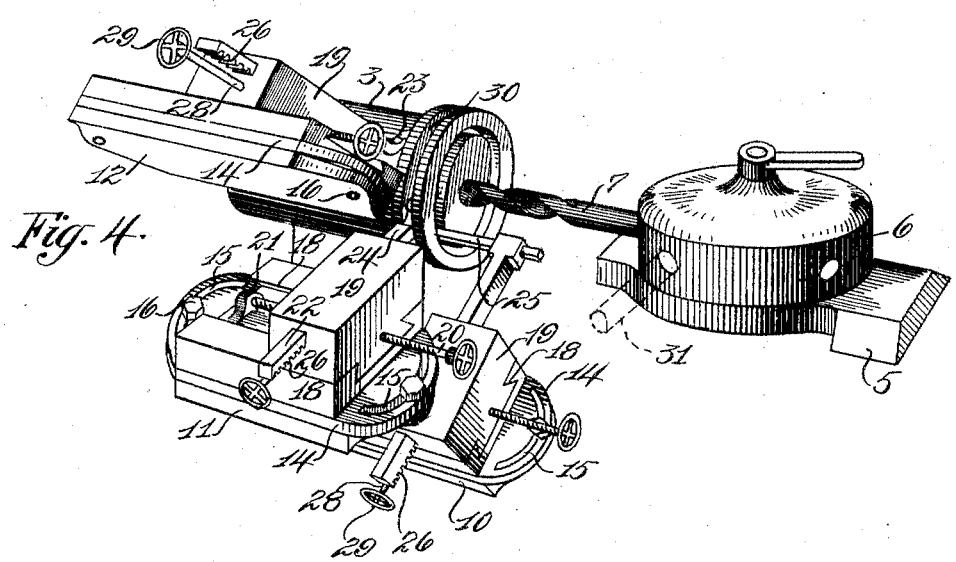
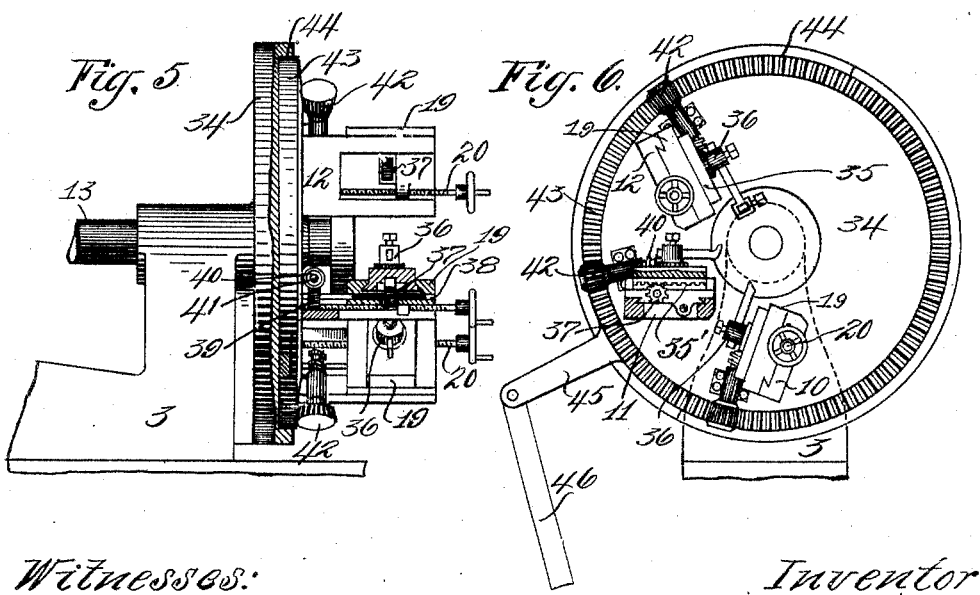
Witnesses:
C. A. Jarvis.
C. C. Fuss.
Inventor:
Walter L. Cheney.
By his Attorney,
F. H. Richards.

No. 777,181.

Patented December 13, 1904.

UNITED STATES PATENT OFFICE.

WALTER L. CHENEY, OF MERIDEN, CONNECTICUT, ASSIGNOR OF ONE-HALF TO BENJAMIN HOWARD WARREN, OF ALBERENE, VIRGINIA.

LATHE.

SPECIFICATION forming part of Letters Patent No. 777,181, dated December 13, 1904.

Application filed June 10, 1903. Serial No. 160,803. (No model.)

*To all whom it may concern:*

Be it known that I, WALTER L. CHENEY, a citizen of the United States, residing in Meriden, in the county of New Haven and State of Connecticut, have invented certain new and useful Improvements in Lathes, of which the following is a specification.

This invention relates to lathes; and its principal object is to enable an increased number and variety of cuts to be taken simultaneously upon the work as it rotates upon the live-spindle.

In turret-lathes and others the slide-rest, which is usually placed between the turret or the tail-stock and the head-stock, is oftentimes in the way of the turret or other tools, and the latter are in consequence required to be lengthened in order to reach over the slide-rest, thus making them unduly long, and hence not sufficiently stiff for some purposes. In certain forms of heavy lathes a cross-slide has been placed on the turret itself, whereby the latter may be rotated to get the cross-slide out of the way, so that the turret may be moved up close to the head-stock, thereby enabling the use of short tools upon the turret; but in such lathes the cross-slide cannot be used at the same time that boring or other work is being done by the turret-tools. In some other lathes the slide-rest is formed so that it may be run forward close to the head-stock and beneath the work-holding chuck; but in this position it is of little or no use. In all of the machines above referred to only one cross-slide tool can be cutting at a time.

According to my invention several cross-slides are mounted upon bases which are integral with or fixed upon the head-stock all close to the end of the live-spindle and converging toward said spindle, thus enabling several different cuts to be made at the same time that boring is done with a turret-tool and also while the turret is being withdrawn and rotated to bring a new tool into action.

Figure 1:
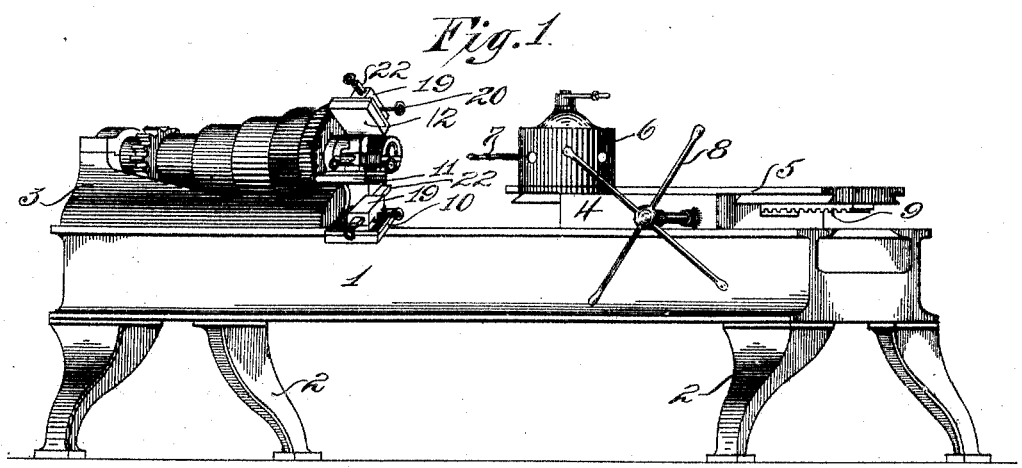
Figures 2, 3:
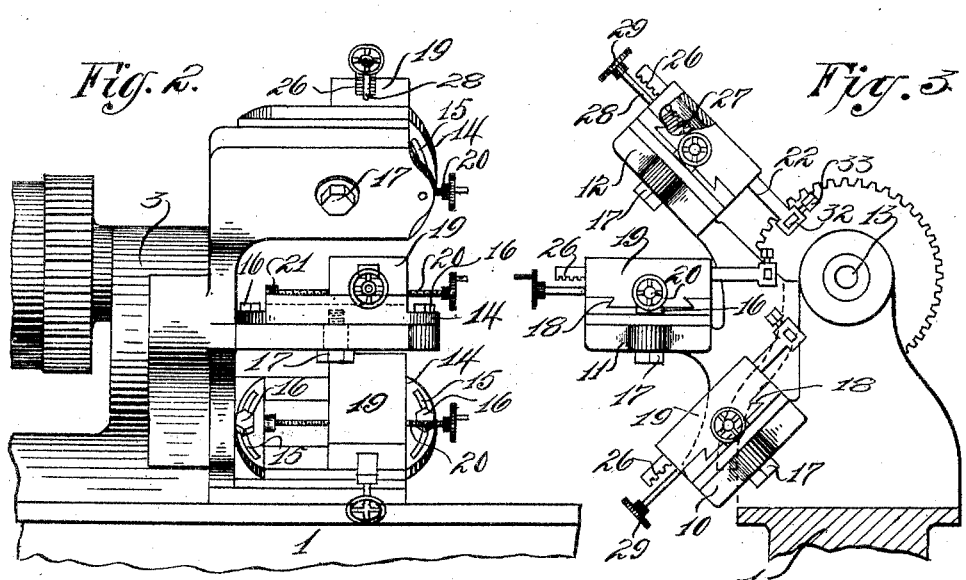

In the drawings forming part of this specification, Figure 1 is a perspective view of one form of lathe made in accordance with my improvements. Fig. 2 is an enlarged view of the right-hand end of the head-stock with my improvements applied thereto. Fig. 3 is an end view of the parts seen at Fig. 2. Fig. 4 is a perspective illustrating the simultaneous operation of four tools upon the work. Fig. 5 is a side elevation; and Fig. 6 is a face view, partly in section, of a form of my invention in which simple means are provided for feeding either one or more of the tools.

In the several views like signs denote like parts.

The bed of the lathe is designated as 1, the legs as 2, and the head-stock as 3. Upon the bed, as shown in Fig. 1, may rest a block 4, carrying a slide 5, upon which is mounted a turret 6, having a plurality of radial boring and other tools 7, the movements of said slide and turret being controlled in the usual manner by a hand-wheel 8, which operates a pinion in mesh with a rack 9 upon the slide.

Fixed upon the end of the head-stock 3 or integral therewith is a set of bases 10, 11, and 12, which converge toward the live-spindle 13 and are located close thereto, so as to be out of the way of the turret 6 or other device for operating upon the central portion of the stock. Upon each base is swiveled a plate 14, provided with concentric slots 15, set-screws 16 passing through the slots and being threaded into the support. The plates are swiveled upon screws 17, and each is provided upon its upper side with a guide 18, in which is mounted a slide 19, which may move in said guide longitudinally of the spindle 13, such movement being effected by a screw 20, which is threaded through the slide and works in an ear 21, provided upon the swiveled plate 14. In each of the slides is mounted at right angles to the guide 18 a tool-shank 22, which passes entirely through the slide and carries upon its inner end a tool, these tools being designated as 23, 24, and 25. Each tool-shank 22 may be provided with a rack 26, engaged by a worm 27, carried upon a shaft 28, which is provided with a hand-wheel 29 for feeding the shank and its tool toward the work 30. At Fig. 4 the turret-tool 7 is shown as boring the work. While the tool 23 trims one corner of the work the tool 24 makes a peripheral groove therein, and the tool 25 makes a face groove therein. Four or more operations may thus be carried on simultaneously, if desired, and the tools 23, 24, and 25 are operable while the turret 7 is being withdrawn and another turret-tool 31 is being brought into action. As shown at Fig. 3, each shank may be provided at its inner end with an eye 32 for receiving the tool and with a set-screw 33 for securing the tool in the eye.

It will thus be seen that my invention not only takes the place of a slide-rest on the turret or other lathe, but that it will do much more than is possible to do by the usual slide, since several more tools can be cutting at once. Moreover, the set of cross-slides may be extended around to the back side of the lathe, so that while some tools are cutting at the front others can be cutting at the back, thus eliminating the tendency of the work to draw out of the chuck, as when heavy cuts are being taken on one side of the work. The feed-screws may be releasably connected by gearing to the live-spindle, so as to enable screw-threads to be cut on the work, and the screw or worm 27 may be likewise releasably connected to the spindle for certain classes of work. By the use of the compound or swiveled slides it becomes practicable to turn bevel or taper work, although in all forms of my invention it is not essential to employ the swiveled slides. By swiveling the plates which rest directly upon the fixed bases 10, 11, and 12 and mounting the transverse slides upon said plates it becomes practicable to feed the tools in different directions simultaneously. It will be seen that the slides and their bases are out of the way of any tools in the turret and also out of the way of a cross-slide upon a turret or of any other tools in any place where they are ordinarily used.

It is evident that by this invention various cuts which are now tediously taken only one at a time with the usual slide-rest can be made all at once, while operations of turret or other tools are going on and without the liability of interference of a cross-slide with the turret-tools or the necessity of using elongated or otherwise undesirable special tools upon the turret to reach over an ordinary cross-slide, such as usually supported upon the shears.

Referring now to Figs. 5 and 6, the bases 10, 11, and 12 project from a disk-like head 23, secured to or formed on the head-stock 3, and upon each of the slides 19 is mounted a transverse slide 35, provided with a stock 36, in which is inserted the shank of the tool. The slide 35 is provided upon its under side with a rack 35', in mesh with which is a pinion 37, the latter being splined upon the shaft 38, which is journaled in the slide 19 longitudinally thereof, so that the pinion may slide along said shaft while it is being rotated thereby to feed the slide 35. Upon the inner end of the shaft 38 is mounted a worm-wheel 39, and a worm 40 in mesh therewith is mounted upon a radial shaft 41, upon the end whereof is placed a bevel ratchet-pinion 42, which meshes with a bevel-gear 45. Said gear is in the form of an annulus seated in an annular groove 44, formed in said head 34 and provided with a handle or arm 45, which may be reciprocated either manually or by any suitable connection with a revolving part of the lathe, a part of such connection being shown at 46. The connections to the gear 42 are similar for all of the tool-carriages, so that by vibrating said gear all of the tools may be fed to the work simultaneously. Each of the ratchet-pinions may be provided with a device for throwing the same out of use, so that only one or two of the tools may be operated when occasion requires.

Variations may be resorted to within the scope of my invention, and portions of my improvements may be used without others. It is immaterial whether the spindle 13 be mounted horizontally, as illustrated, or vertically, as in a boring-machine, so long as the several slide-rests have the relative arrangement illustrated. Suitable connections from the spindle may also be provided for feeding either one or all of the slides 19 by power longitudinally of the lathe either singly or simultaneously. Either one or all of the tools may be fed by power at the same time in the same or different directions—as, for instance, in turning the periphery and simultaneously facing the work.

Having thus described my invention, I claim—

1. The combination with the bed of a metal-turning or like machine, of a head-stock rigidly secured thereto, a spindle mounted in the head-stock, a plurality of supporting-bases extending from and integral with the head-stock, the bases being disposed substantially radially of the spindle-axis and the plane of each base intersecting the circle defining the maximum swing of the machine, and a tool-slide mounted on each base.

2. The combination with the bed of a metal-turning or like machine along which a tool-supporting carriage is adapted to travel, of a head-stock rigidly secured to said bed, a spindle mounted in the head-stock, a series of supporting-bases extending from and integral with the head-stock, each base being disposed substantially radially of the spindle and its plane intersecting the circle defining the maximum swing of the machine, a swiveled plate on each base, and a tool-slide mounted on each swiveled plate.

3. The combination with the bed of a metal-turning or like machine along which a tool-supporting carriage is adapted to travel, of a head-stock rigidly secured to said bed, a spindle mounted in the head-stock, a plurality of supporting-bases extending from and integral with the head-stock, the bases being disposed substantially radially of the spindle and the plane of each base intersecting the circle defining the maximum swing of the machine, a swiveled plate on each of said supporting-bases, a tool-slide mounted on each swivel-plate, and means for feeding all of the tool-slides simultaneously.

WALTER L. CHENEY.

Witnesses:
P. R. SNYDER,
A. I. FINDLEY.